United States Patent
Chen

(10) Patent No.: US 9,296,266 B1
(45) Date of Patent: Mar. 29, 2016

(54) METHOD FOR CORRECTING ID CODES AFTER INSTALLATION OF TIRE PRESSURE SENSORS ON A VEHICLE

(71) Applicant: E-LEAD ELECTRONIC CO., LTD., Changhua (TW)

(72) Inventor: Stephen Chen, Changhua (TW)

(73) Assignee: E-Lead Electronic Co., Ltd., Changhua (TW)

( * ) Notice: Subject to any disclaimer, the term of this patent is extended or adjusted under 35 U.S.C. 154(b) by 0 days.

(21) Appl. No.: 14/572,363

(22) Filed: Dec. 16, 2014

(51) Int. Cl.
    G06F 17/00 (2006.01)
    B60C 23/04 (2006.01)
    G06K 19/07 (2006.01)
    G06K 7/10 (2006.01)

(52) U.S. Cl.
    CPC ............ B60C 23/04 (2013.01); G06K 7/10366 (2013.01); G06K 19/0717 (2013.01)

(58) Field of Classification Search
    CPC .................. G06K 19/07764; G06K 19/07786; G06K 7/10297
    USPC ......................................... 235/375, 429, 439
    See application file for complete search history.

(56) References Cited

U.S. PATENT DOCUMENTS

| | | | |
|---|---|---|---|
| 8,115,610 B2* | 2/2012 | Lionetti | B60C 23/0408 235/384 |
| 2013/0248600 A1* | 9/2013 | Penot | G06K 19/07786 235/439 |
| 2015/0183279 A1* | 7/2015 | Okada | B60C 23/0488 235/375 |

* cited by examiner

*Primary Examiner* — Seung Lee
(74) *Attorney, Agent, or Firm* — Wang Law Firm, Inc.

(57) ABSTRACT

A method for correcting ID after installation of tire pressure sensors on a vehicle includes: ID reading, ID comparison, ID group setting up and ID burning. An ID setting device reads and compares ID codes of tire pressure sensors of all tires of the vehicle, then confirms the ID group of the ID codes and stores them in a memory module. Reading the ID code of one of the tire pressure sensors can obtain ID codes of the rest tire pressure sensors in the same ID group, therefore all tire pressure sensors can be reproduced without subjecting the receiver to the learning procedure. Or, when some of the sensors break down and the corresponding ID codes cannot be read, the ID codes of all the tires in the same ID group can be obtained by reading other ID codes of the rest tires in the same ID group.

10 Claims, 4 Drawing Sheets

METHOD FOR CORRECTING ID CODES AFTER INSTALLATION OF TIRE PRESSURE SENSORS ON A VEHICLE

BACKGROUND OF THE INVENTION

1. Field of the Invention

The present invention relates to a method for correcting ID codes on a vehicle, and more particularly to a method for correcting ID codes after installation of tire pressure sensors on a vehicle.

2. Description of the Prior Art

TPMS (Tire Pressure Monitoring System) is installed in a tire to measure or monitor the tire pressure, when the vehicle is moving, and report it to the vehicle's instrument cluster or a corresponding monitor.

FIG. 1 is a diagram of a conventional TPMS, wherein a tire pressure display device 10 comprises: a receiver 11, a display 12 and a plurality of tire pressure sensors 13 mounted inside the tires. When the tire pressure display device 10 works, the sensors 13 sense the tire pressure and report it in a wireless manner to the receiver 11, then the pressure is displayed on the display 12 to inform the driver, which contributes to driving safety and saving gas. A vehicle has at least four wheels, in order for the receiver 11 to receive the tire pressure simultaneously for all of the four wheels and recognize the location of the tire and the corresponding tire pressure, there is an exclusive ID code (identification code) for each of the tire pressure sensors 13, and each sent tire pressure contains such an ID code.

The ID code itself does not show the location of the tire. After the tires are installed, the sensors are actuated or triggered by a special tool based on the tire locations, then the triggered sensors send out ID code, and the receiver receives the ID code and creates a correlation with the tire locations, which enables the receiver to locate the tire by the received ID code, and this is called receiver learning procedure.

However, the correlation between the tires and the ID code will disappear, or when the battery dies, the battery change means that the whole sensors have to be replaced, and the receiver has to be subjected to a new learning procedure again.

The receiver learning procedures vary from different manufacturers and are relatively complicated, which makes it difficult for an ordinary tire shop worker to understand the receiver learning procedures of different manufacturers.

Therefore, a so-called universal sensor replacement part appeared on the market. This sensor replacement part uses a special tool to read the original ID code, write an exclusive program based on the communication protocol between the sensors and the receiver, and burn the program and the ID code into the replacement part. Then the tire pressure sensors 13 with dead batteries are replaced with the replaced part, while the receiver is still useful and does not have to be replaced.

Sometimes, however, the battery of the sensors dies so completely that the special tool is unable to read the ID code, and the problem of tire change is also not solved. Hence, the receiver learning procedure is still inevitable.

The present invention has arisen to mitigate and/or obviate the afore-described disadvantages.

SUMMARY OF THE INVENTION

The primary objective of the present invention is to provide a method for correcting ID after installation of tire pressure sensors on a vehicle, which comprises: a step of ID reading, a step of ID comparison, a step of ID group setting up and a step of ID burning. A ID setting device reads and compares all the ID codes of the tire pressure sensors of all the tires of the vehicle, then confirms the ID group of the ID codes which have been read and stores them in a memory module which is connected to the ID setting device. By such arrangements, reading the ID code of one of the tire pressure sensors can obtain other ID codes of the rest tire pressure sensors in the same ID group, so that the tire pressure sensors of all the tires can be reproduced without subjecting the receiver to the learning procedure. Or, when the tire pressure sensors of some of the tires break down and the corresponding ID codes cannot be read, the ID codes of all the tires in the same ID group can be obtained by reading other ID codes of the rest tires in the same ID group.

To achieve the above objective, a method for correcting ID codes after installation of tire pressure sensors on a vehicle in accordance with the present invention comprises: a step of ID reading, a step of ID comparison, a step of ID group setting up and a step of ID burning.

The step of ID reading includes installing one of the tire pressure sensors in each of tires of the vehicle, and providing each of the tire pressure sensors with an exclusive ID code, using an ID setting device to read the ID code of the tire pressure sensor in any of the tires.

The step of ID comparison includes connecting the ID setting device to a memory module and a display module, using the ID setting device to compare whether the ID code exists in the memory module, if yes, the ID setting device takes out a file which contains the ID code and an group account corresponding to the ID code from the memory module, and displays it on the display module, then the step of ID burning is carried out, if Not, the step of ID group setting up is carried out.

The step of ID group setting up includes using the ID setting device to read all the ID codes of all the tire pressure sensors of the vehicle based on the locations of the tires, and all the ID codes and a tire location information form an ID group which is to be stored in the file of the group account, then the file of the group account and the ID group stored in the file are stored in the memory module to create a correlation between the file of the group account and the ID group.

The step of ID burning includes using the ID setting device to burn the ID codes in the file of the group account into the tire pressure sensors of the tires of the vehicle, after the tires have been replaced or adjusted in position with respect to the vehicle.

Preferably, the group account is a license plate number.

Preferably, the memory module is an inner memory or a storage unit of the ID setting device, or of a computer, or of a network server.

Preferably, the file of the group account contains the ID codes of the tire pressure sensors of all the tires, the tire location information, and a data regarding the date and time of installation of the tire pressure sensors. Preferably, the tire pressure sensors can set a time of installation time which is input by manual or burned into the file of the group account at the time of burning new program. The display module includes an inner display screen built in the ID setting device or an outer display screen disposed outside the ID setting device. Or, the display module is a smart phone with ID setting micro application program.

DETAILED DESCRIPTION OF THE PREFERRED EMBODIMENTS

Figure 1:
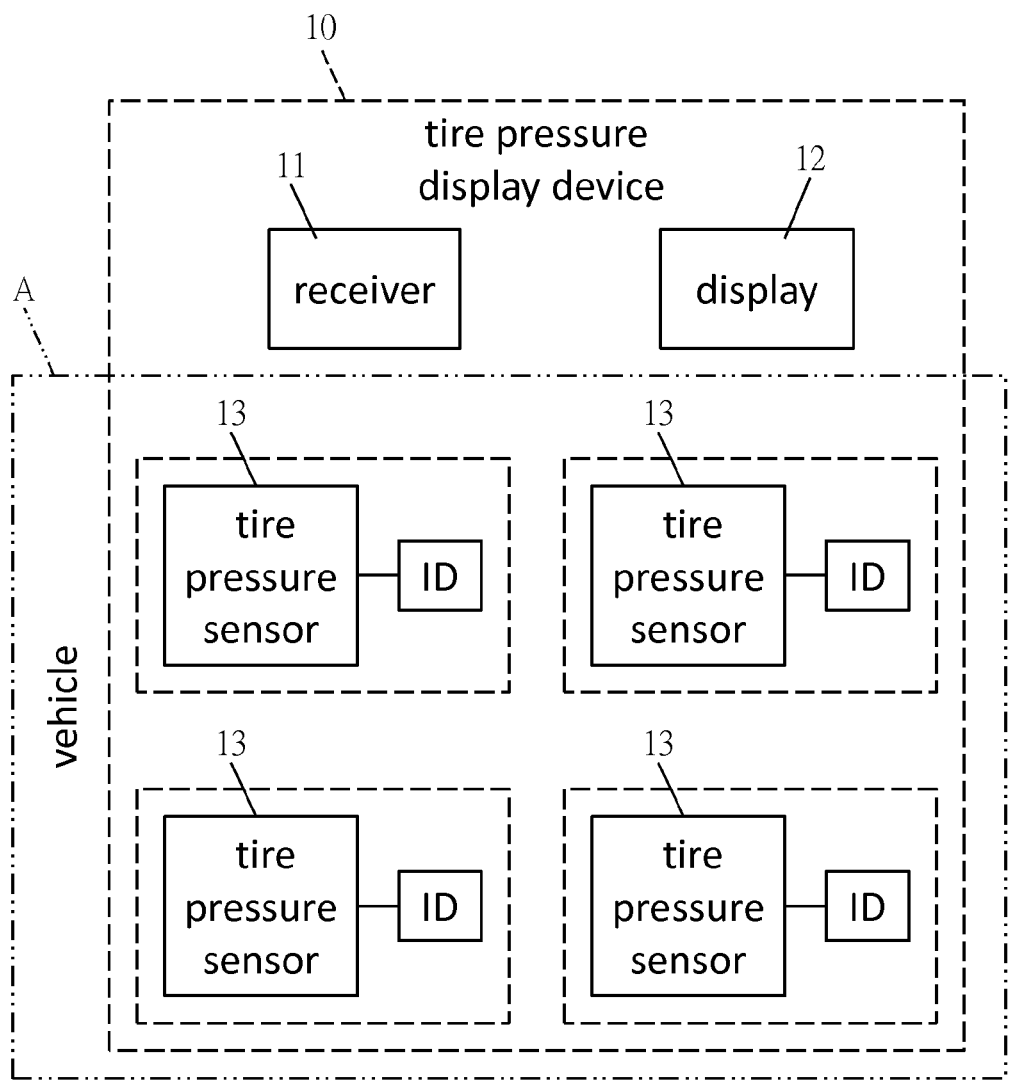
FIG. 1 is a diagram of a conventional TPMS.

The present invention will be clearer from the following description when viewed together with the accompanying drawings, which show, for purpose of illustrations only, the preferred embodiment in accordance with the present invention.

Referring to FIGS. 2-5, a method for correcting ID codes after installation of tire pressure sensors on a vehicle in accordance with the present invention comprises: a step S1 of ID reading, a step S2 of ID comparison, a step S3 of ID group setting up and a step S4 of ID burning. As shown in FIG. 3, the method in accordance with the present invention essentially involves the uses of an ID setting device 20 and a vehicle 30. The ID setting device 20 comprises: a memory module 21, a group account 22, a processor 23 and a wireless module 24. The vehicle 30 includes four or five tires 31 and a corresponding number of tire pressure sensors 32.

Figure 2:
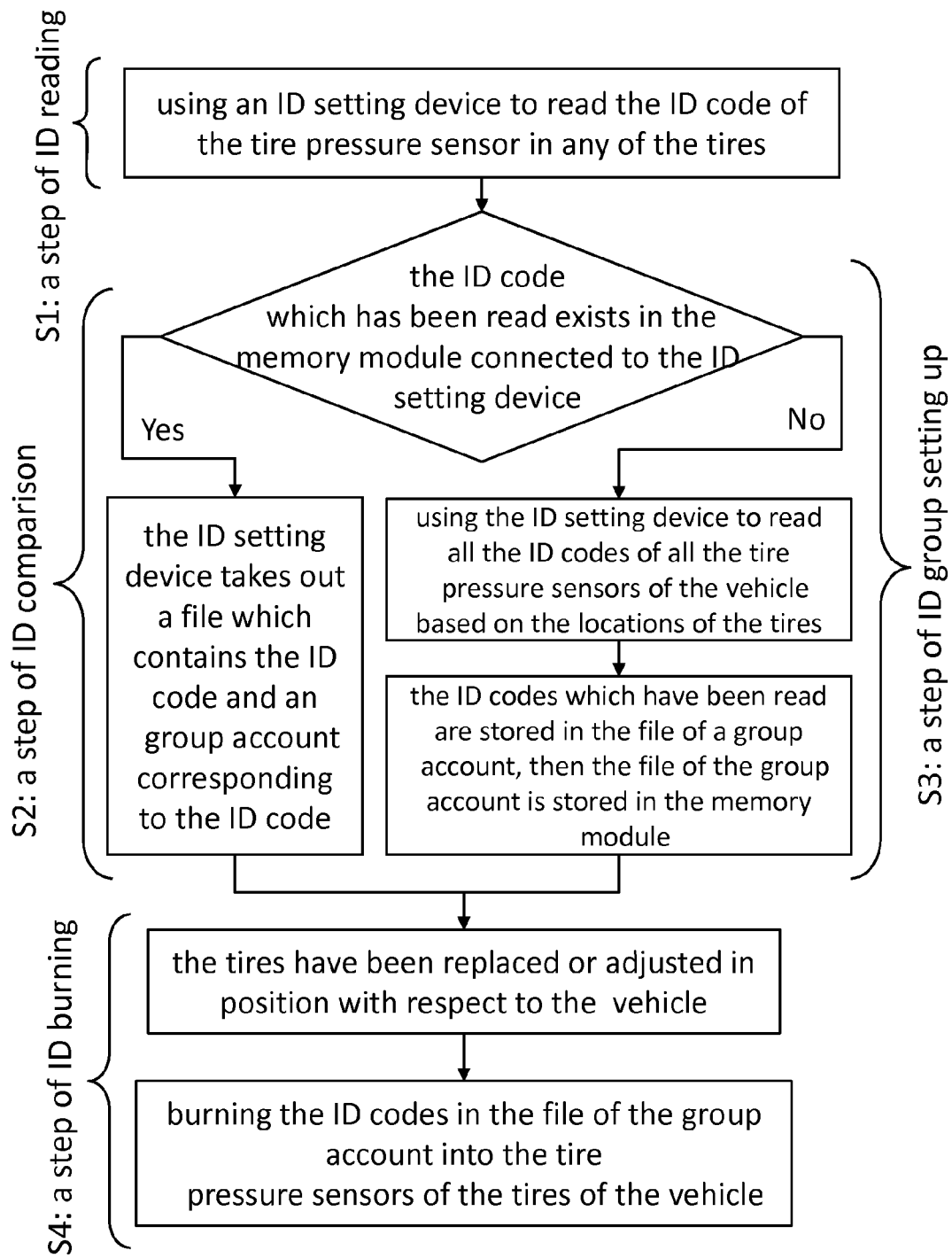
FIG. 2 is a flow chart of a method for correcting ID codes after installation of tire pressure sensors on a vehicle in accordance with the present invention.

The steps S1, S2, S3 and S4 of ID reading, ID comparison, ID group setting up and ID burning are described follows by referenced to FIG. 2.

The step S1 of ID reading includes installing one tire pressure sensor 32 in each of the tires 31 of the vehicle 30, and providing each of the tire pressure sensors 32 with an exclusive ID code 33, using the ID setting device 20 to read the ID code 33 of the sensor 32 in any of the tires 31.

The step S2 of ID comparison includes connecting the ID setting device 20 to the memory module 21 and a display module, using the ID setting device 20 to compare whether the ID code 33 exists in the memory module 21. If Yes, the ID setting device 20 takes out (reads) a file which contains the ID code 33 and a group account 22 matching the ID code 33 from the memory module 21, and displays it on the display module, then the step S4 of ID burning is carried out. If Not, the step S3 of ID group setting up is carried out.

Figure 3A:
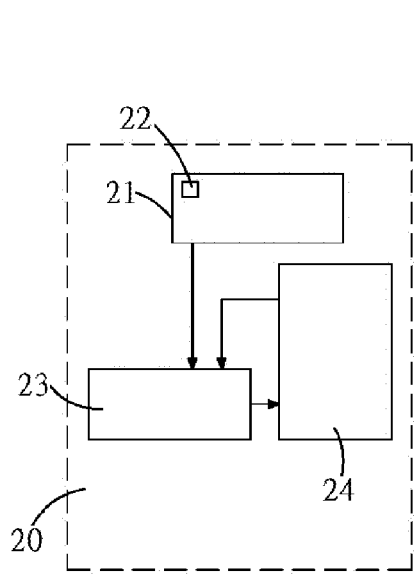
FIG. 3A is a diagram showing an ID setting device and the vehicle in accordance with the present invention.
Figure 3A:
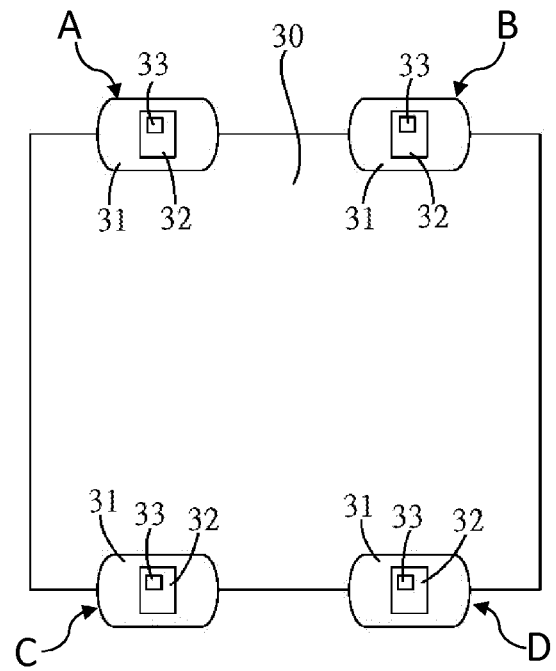

As shown in FIG. 3A, for example, the vehicle 30 of this embodiment is provided with four tires 31 which are designated with A, B, C and D, respectively, and four tire pressure sensors 32. The ID codes 33 are designated with 33A, 33B, 33C and 33D respectively. During the steps S1 and S2, when a serviceman uses the ID setting device 20 to read an exclusive ID code 33 of a tire pressure sensor 32 from any of the tires 31, the ID code 33 will be sent to the processor 23 of the ID setting device 20 and compared with all ID codes which are arranged in sequence in the memory module 21. If the ID code 33 is the same as one of the ID codes in the memory module 21, the display module will show the file which contains the ID code 33, and list all ID codes 33A, 33B, 33C and 33D and the locations of the corresponding tires 31, for the user to read.

The memory module 21 can be an inner memory or a storage unit of the ID setting device 20, or of a computer connected to the ID setting device 20, or of a network server accessible via cloud technology. All the ID codes 33 in the memory module 21 are arranged in sequence for quick search and comparison, and the ID setting device 20 takes out the file of the group account 22 matching the ID code 33. The group account 22 can be a license plate number, or a number indicating the type of car or indicating the year of manufacture. More particularly, the file of the group account 22 contains all the ID codes 33 of the tire pressure sensors 32 of all the tires 31 of the vehicle 30, and the tire location information corresponding to the ID codes 33A, 33B, 33D and 33D. After comparison, the step S4 of ID burning is carried out if the ID code 33 is found in the memory module 21. If there is no corresponding ID code in the memory module 21, which means that the ID code 33 which was read by the ID setting device 20 from the tire pressure sensor 32 does not exist in the memory module 21. Therefore, the step S3 of ID group setting up must be performed prior to the step S4 of ID burning to set up relative information.

The step S3 of ID group setting up includes using the ID setting device 20 to read all the ID codes 33 of all the tire pressure sensors 32 of the vehicle 30 based on the locations of the tires 31, and all the ID codes 33 and the tire location information form an ID group which is to be stored in the file of the group account 22, then the file of the group account 22 and the ID group stored in the file are stored in the memory module 21 to create a correlation between the file of the group account 22 and the ID group.

In the step S3 of ID group setting up of this embodiment, when the serviceman uses the ID setting device 20 to read to read all the ID codes 33 of all the tire pressure sensors 32 of the vehicle 30 based on the locations of the tires 31, information in written language will be displayed on the display module to instruct the serviceman to read all the ID codes 33 of all the tire pressure sensors 32 disposed in the tires of the vehicle 30 by following the instructed tire locations, and store the ID codes 33 and the corresponding tire locations into the file of the group account 22, and then the step S4 of ID burning is carried out after the group account 22 and the file are stored in the memory module 21 of the ID setting device 20.

The step S4 of ID burning includes using the ID setting device 20 to burn the ID codes 33 in the file of the group account 22 into other tire pressure sensors 32 of the vehicle 30, after the tires 31 have been replaced or adjusted in position with respect to the vehicle 30.

Figure 3B:
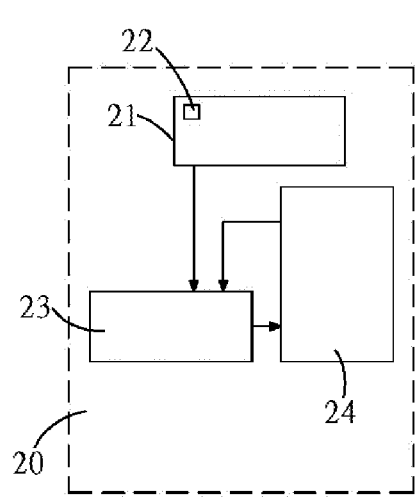
FIG. 3B is another diagram showing the ID setting device and the vehicle in accordance with the present invention.
Figure 3B:
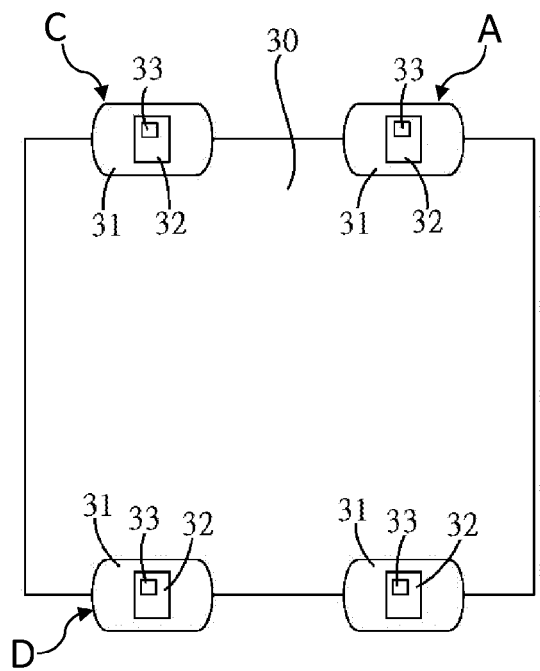

In this embodiment, the tires 31 have been replaced or adjusted in position with respect to the vehicle 30, which means that the tires 31 are disassembled, exchanged in position, and reassembled to the vehicle 30 when the vehicle 30 is serviced, or the tire pressure sensors 32 in the tires 31 are replaced with new ones, or the positions of the tires 31 can also be changed by other reasons. As shown in FIG. 3B, when the position of the tires 31 changes, the serviceman can use the wireless module 24 of the ID setting device 20 to obtain the file of the group account 22 by following the above mentioned steps. The file of the group account 22 includes the ID codes 33 of the tire pressure sensors 32 of all the tires 31, and the tire location information corresponding to the ID codes 33A, 33B, 33C and 33D. The serviceman can use the ID setting device 20 to wirelessly re-burn the ID codes 33 from the file of the ID group of the group account 22, respectively, into the tire pressure sensors 32 of all the tires 31 of the vehicle 30. By such arrangements, no matter how the tires 31 are adjusted in position or the tire pressure sensors 32 replaced, the method for correcting ID codes after installation of tire pressure sensors can ensure that the ID codes 33A, 33B, 33C and 33D of the tires 31 of the vehicle 30 and the tire locations, after re-burning of the ID codes 33, are the same as the original settings (as shown in FIG. 3A), so that the receiver does not have to be subjected to the learning procedure again.

When the tire pressure sensor 32 of one of the tires 31 breaks down or the battery is so dead that the tire pressure sensor 32 is unable to emit ID codes 33, and the ID codes 33 of the tire pressure sensor 32 therefore cannot be read, the method for correcting ID in accordance with the present invention can ensure that all the ID codes 33 can be obtained and read as long as a tire pressure sensor 32 in one of the at least four tires 31 of the vehicle 30 is still able to emit ID code 33.

Figure 4:
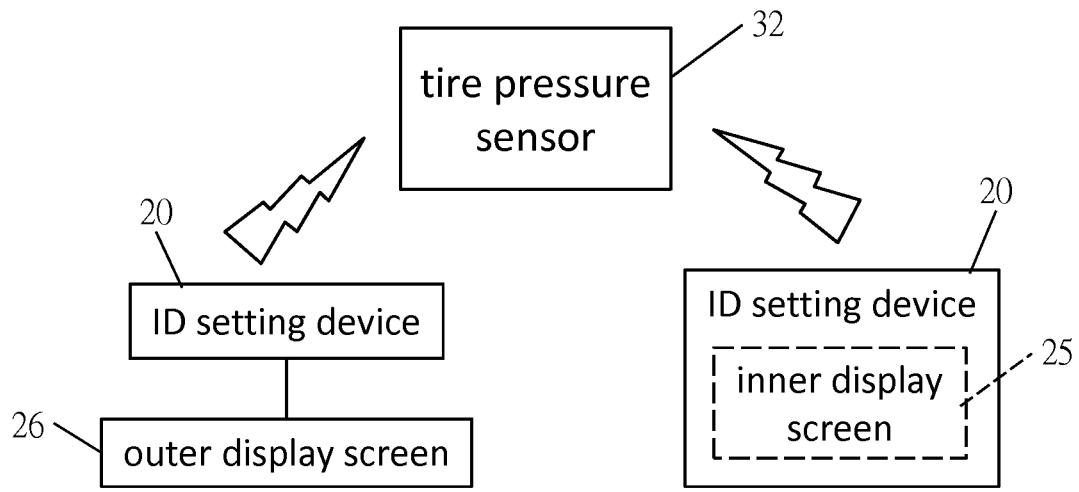
FIG. 4 is an illustrative view of a display screen of the ID setting device in accordance with the present invention.

The file of the group account 22 contains the ID codes 33 of the tire pressure sensors 32 of all the tires 31, the tire location information, and the data regarding the date and time of installation of the tire pressure sensors 32. As shown in FIG. 4, the ID setting device 20 further comprises a display module which includes an inner display screen 25 built in the ID setting device 20 or an outer display screen 26 disposed outside the ID setting device 20. The display module displays the ID codes 33 of the tire pressure sensors 32, the corresponding tire locations, and the data regarding the date and time of installation of the tire pressure sensors 32.

In this embodiment, the tire pressure sensors 32 can set a time of installation time which can be input by manual or burned into the file of the group account 22 at the time of burning new program. Normally, the life of the tire pressure sensors 32 is approximately 5 years. If the tire pressure sensor 32 of a tire 31 to be retreaded or replaced has been used longer than a set time (for four years for example), the serviceman will know that the tire pressure sensor 32 has only one year of service life left, and suggest the vehicle owner replace the tire pressure sensor 32 together with the tire, which not only improves the safety of the vehicle, but also saves the time and expense since the vehicle owner does not have to go back to the dealer again with a year in order to get the tire removed and the tire pressure sensor 32 replaced.

Figure 5:
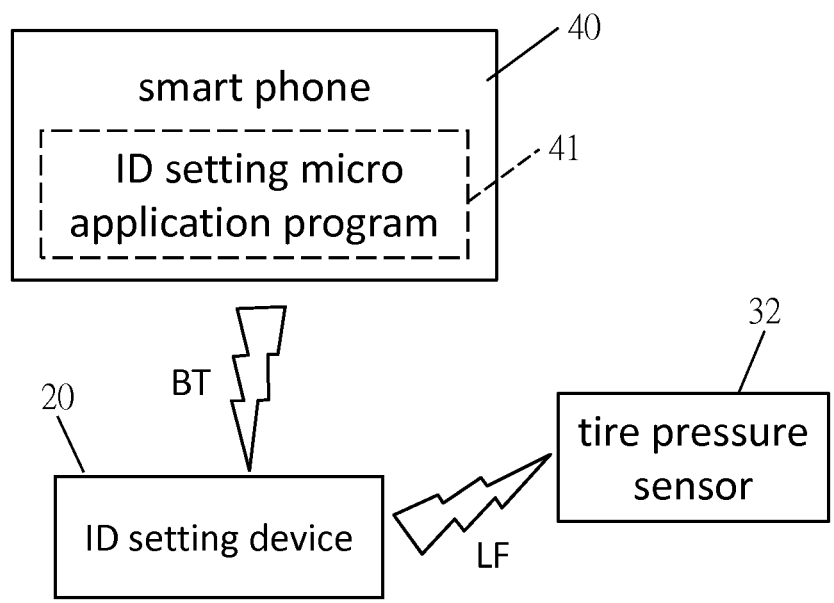
FIG. 5 is an illustrative view showing that the present invention is used in combination with a smart phone or an ID setting device.

Referring then to FIG. 5, the display module of the method for correcting ID in accordance with the present invention can also be a smart phone 40 with ID setting micro application program 41 which allows the serviceman to use the present invention more easily. The ID setting device 20 can communicate with the tire pressure sensors 32 of the vehicle 30 via LF (low frequency) transmission. The smart phone 40 controls the ID setting device 20 and communicates with the tire pressure sensors 32 of the vehicle 30 via Bluetooth. The ID setting device 20 of the method for correcting ID in accordance with the present invention can be a smart phone 40 installed with the ID setting micro application program 41, and the smart phone 40 is able to communicate with the tire pressure sensors 32 of the vehicle 30, which allows the serviceman to use the present invention more easily.

With the method of the present invention, the receiver does not have to be subjected to the learning procedure, when the tires 31 or the tire pressure sensors 32 are replaced. Namely, a reading tool can be used to read all the ID codes 33 of all the tire pressure sensors 32 of the vehicle 30 based on the locations of the tires 31, and all the ID codes 33 and the tire location information form an ID group which is to be stored in the file of the group account 22, then the file of the group account 22 is stored in the memory module 21.

In conclusion, the method for correcting ID codes after installation of tire pressure sensors on a vehicle in accordance with the present invention can truly avoid the receiver from the learning procedure, at the time the tire or the tire pressure sensor is replaced, which makes it easier for the servicemen to do related work. To the car owner, the method of the present invention can improve driving safety while saving the time and expense since the vehicle owner does not have to get the vehicle rechecked within a short time.

While we have shown and described various embodiments in accordance with the present invention, it is clear to those skilled in the art that further embodiments, such as replacing the smart phone 40 with tablet PC or notebook, may be made without departing from the scope of the present invention.

What is claimed is:

1. A method for correcting ID codes after installation of tire pressure sensors on a vehicle comprising: a step of ID reading, a step of ID comparison, a step of ID group setting up and a step of ID burning; wherein:
   the step of ID reading includes installing one of the tire pressure sensors in each of tires of the vehicle, and providing each of the tire pressure sensors with an exclusive ID code, using an ID setting device to read the ID code of the tire pressure sensor in any of the tires;
   the step of ID comparison includes connecting the ID setting device to a memory module and a display module, using the ID setting device to compare whether the ID code exists in the memory module, if yes, the ID setting device takes out a file which contains the ID code and an group account corresponding to the ID code from the memory module, and displays the file on the display module, then the step of ID burning is carried out, if not, the step of ID group setting up is carried out;
   the step of ID group setting up includes using the ID setting device to read all the ID codes of all the tire pressure sensors of the vehicle based on the locations of the tires, and all the ID codes and a tire location information form an ID group which is to be stored in the file of the group account, then the file of the group account and the ID group stored in the file are stored in the memory module to create a correlation between the file of the group account and the ID group; and
   the step of ID burning includes using the ID setting device to burn the ID codes in the file of the group account into the tire pressure sensors of the tires of the vehicle, after the tires have been replaced or adjusted in position with respect to the vehicle.

2. The method for correcting ID codes after installation of the tire pressure sensors on the vehicle as claimed in claim 1, wherein the group account is a license plate number.

3. The method for correcting ID codes after installation of the tire pressure sensors on the vehicle as claimed in claim 1, wherein the memory module is an inner memory or a storage unit of the ID setting device.

4. The method for correcting ID codes after installation of the tire pressure sensors on the vehicle as claimed in claim 1, wherein the memory module is an inner memory or a storage unit of a computer.

5. The method for correcting ID codes after installation of the tire pressure sensors on the vehicle as claimed in claim 1, wherein the memory module is an inner memory or a storage unit of a network server.

6. The method for correcting ID codes after installation of the tire pressure sensors on the vehicle as claimed in claim 1, wherein the file of the group account contains the ID codes of the tire pressure sensors of all the tires, the tire location information, and a data regarding the date and time of installation of the tire pressure sensors.

7. The method for correcting ID codes after installation of the tire pressure sensors on the vehicle as claimed in claim 1, wherein the tire pressure sensors can set a time of installation time which is input by manual or burned into the file of the group account at the time of burning new program.

8. The method for correcting ID codes after installation of the tire pressure sensors on the vehicle as claimed in claim 1, wherein the display module includes an inner display screen built in the ID setting device or an outer display screen disposed outside the ID setting device.

9. The method for correcting ID codes after installation of the tire pressure sensors on the vehicle as claimed in claim 1, wherein the display module is a smart phone with ID setting micro application program.

10. The method for correcting ID codes after installation of the tire pressure sensors on the vehicle as claimed in claim 1, wherein the display module is a smart phone.

* * * * *